July 31, 1956  G. N. STEELE  2,756,644
VACUUM FIXTURE
Filed Sept. 4, 1953

INVENTOR.
GORDON N. STEELE
BY *William R. Lane*
ATTORNEY

United States Patent Office 2,756,644
Patented July 31, 1956

2,756,644
VACUUM FIXTURE

Gordon N. Steele, El Segundo, Calif., assignor, by mesne assignments, to the United States of America as represented by the United States Atomic Energy Commission Application September 4, 1953, Serial No. 378,648

3 Claims. (Cl. 90—59)

This invention relates to fixtures and particularly to a vacuum fixture.

A fixture is a device used primarily for holding a work piece during a machining operation, particularly when numerous interchangeable articles are to be machined. During the machining operation, the work piece must be held by the fixture with sufficient rigidity to maintain its alignment when subjected to the forces from the cutting tool. The labor required to align and secure the work piece in the fixture prior to machining adds materially to the cost of making the finished product. In the past, it has been necessary to design elaborate fixtures particularly where the work piece was very small or thin or where the work piece did not have a flat surface which would readily be held against the base of the fixture.

It is therefore an object of this invention to provide an improved fixture for supporting a work piece during a machining operation.

It is another object of this invention to provide an improved support for temporarily supporting a movable object.

It is a further object of this invention to provide an improved fixture which materially reduces the set-up time for a machine tool operation by utilizing an evacuated porous block against which the work piece is rigidly held by air pressure.

It is another object of this invention to provide an improved vacuum fixture for holding a work piece in position, utilizing a block of porous material having a surface or surfaces ground complementary to the surfaces of the work piece and means for evacuating the pores of the block whereby the work piece is maintained against its complementary surface.

It is a further object of this invention to provide means for maintaining a thin work piece in position during a machine tool operation comprising a block of porous material, one surface of which is complementary to a surface of the work piece and another surface of which is complementary to the surface of the bench bed, means for sealing substantially all the other surfaces of said block, and means for evacuating the pores of said block whereby said work piece is rigidly maintained against said block by air pressure and said block is rigidly maintained in position on said bench bed.

Figure 1:
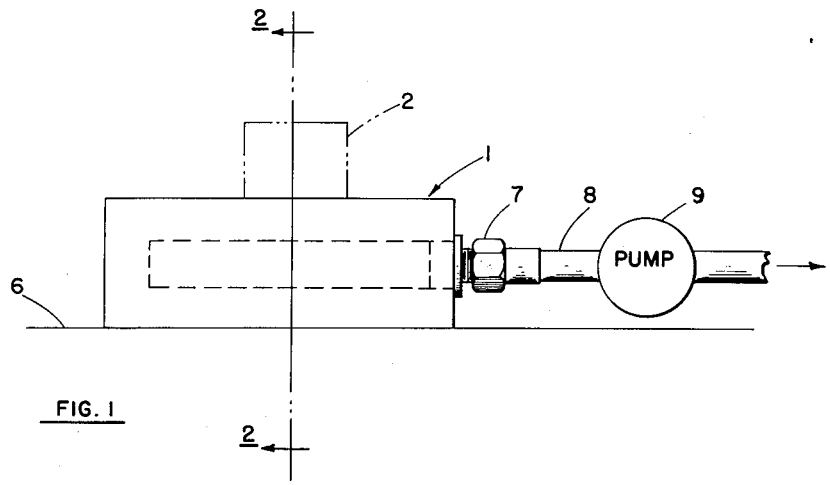
Figure 2:
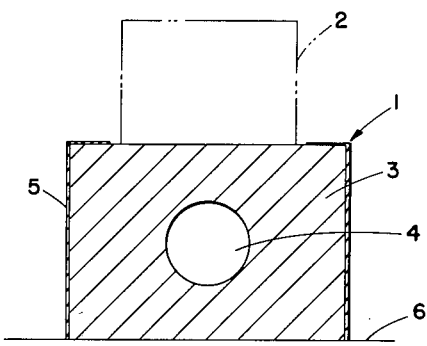
Figure 3:
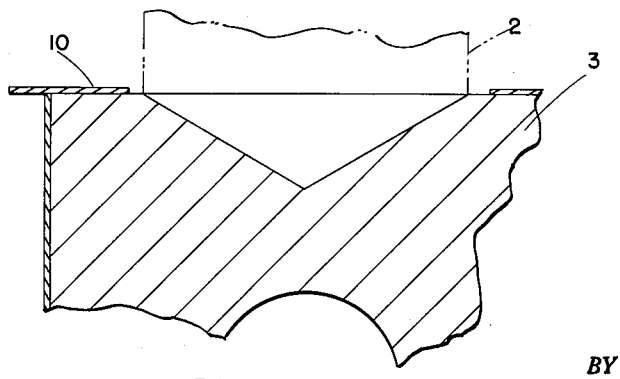

Further objects of invention will become apparent from the following description taken in connection with the accompanying drawings in which Fig. 1 is a view of the preferred embodiment of the vacuum fixture contemplated by this invention;

Fig. 2 is a section view of the preferred embodiment of the vacuum fixture taken along the line of 2—2 of Fig. 1; and Fig. 3 is a section view of a modification of the vacuum fixture of Fig. 1.

Referring now to Fig. 1, vacuum fixture 1 is designed to hold work piece 2 in a fixed position while a machine tool (not shown) performs a desired machining operation on work piece 2. Vacuum fixture 1, shown in detail in Fig. 2, is preferably composed of block 3 of porous material, such as graphite, having cavity 4. Coating 5 of a material impervious to air is placed on the sides and top of block 3 over substantially all of the area not in contact with work piece 2. The lower surface of block 3 is complementary to bench bed 6. Coupling 7 and tube 8 connect cavity 4 to vacuum pump 9.

Referring now to Fig. 3, a modification of vacuum fixture 1 is shown. In this case, the surface of work piece 2 which is to be held against vacuum fixture 1 is not a flat surface. Block 3 is composed of a porous material which is easily machined, such as graphite. The upper surface of block 3 is machined to complement the surfaces of work piece 2. It is not necessary that coating 5 be a permanent impervious coating. For example, a removable cover 10 of Fig. 3 is patterned to fit over the upper surfaces of block 3, covering substantially all of the areas not in contact with work piece 2. The coating on the sides of block 3 may be permanent.

In operation, the vacuum fixture contemplated by this invention accomplishes the maintenance of work piece 2 in a fixed position as follows: Vacuum pump 9 is connected to evacuate cavity 4. Work piece 2 is placed in the desired position on the upper surface of vacuum fixture 1. When chamber 4 is evacuated, the air in the pores of block 3 is also removed and air from the outside atmosphere slowly leaks through the uncovered surfaces of block 3, through the pores and into chamber 4. The air, which was initially in the pores of block 3 immediately adjacent to work piece 2, is evacuated. The outside air, at atmospheric pressure, acts against upper surface of work piece 2, maintaining work piece 2 rigidly against the upper surface of vacuum fixture 1. Since the pores in block 3 immediately adjacent to work piece 2 are maintained at substantially the same vacuum as chamber 4, the total force holding the work piece 2 in place is found by multiplying the pressure differential between the outside atmosphere and chamber 4 by the area of work piece 2.

Similarly, the pores of block 3 which are immediately adjacent to the surface of bench bed 6 are maintained at substantially the same vacuum as chamber 4. Thus, the outside air exerts a force on vacuum fixture 1, forcing it against bench bed 6. The total force acting to hold fixture 1 in position can also readily be calculated by means well known in the art. By coating the surfaces of block 3 which are not covered by bench bed or the work piece with a material which is impervious to air, the work required of vacuum pump 9 in maintaining a comparatively high vacuum in chamber 4 is greatly reduced.

It can readily be seen that by utilizing the invention contemplated by this application, the set-up time required to align and secure a work piece in a fixture prior to machining is materially reduced. After placing work piece 2 on vacuum fixture 1, all that is necessary is to actuate vacuum pump 9 to evacuate chamber 4. When this is accomplished, the machine tool operation is performed. After the operation is completed, vacuum pump 9 is stopped, and the pressure in chamber 4 is allowed to return to that of the outside atmosphere. Work piece 2 is removed and a new work piece placed in position.

The vacuum fixture contemplated by this invention is particularly useful for working very thin pieces of metal. When a thin piece of metal is placed over an evacuated drilled hole, the portion immediately above the hole is forced into the hole, causing an undesired displacement of the metal. By utilizing the block of porous material contemplated by this invention, the microscopic pores do not, to any material extent, cause a displacement of some of the metal. The lower surface of the thin sheet is maintained flush with the working surface of the fixture without any ripples.

It is further contemplated by this invention that media other than the air described in the example can be used to maintain the work piece in position against the fixture. Thus, any fluid which can flow through the pores of the porous block can be used to obtain a pressure differential on the work piece. By evacuating the chamber the pressure of the fluid on the lower surface of the work piece is reduced while the pressure on the upper surface remains the same. Thus, the work piece is subjected to a pressure differential which operates to maintain the work piece against the fixture.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A new and improved vacuum fixture for holding a work piece in a fixed position on a machine bed comprising a block of porous graphite having a working surface shaped to substantially conform with the shape of said work piece and a second surface shaped to conform with said bed, a fitting attached to said block and adapted to couple the pores of said block to a vacuum pump, and an impervious coating covering the external surfaces of said block except said first and second surfaces whereby evacuation of said fitting holds said work piece against said first surface of said block and holds said second surface of said block against said machine bed.

2. A vacuum fixture for holding a very thin work piece in a plane having a predetermined angular relationship with the planar surface of a machine bed comprising a block of porous graphite having two planar surfaces, the relative positions of said planar surfaces being in said predetermined angular relationship; a cavity in said block; a fitting attached to said block and communicating with said cavity; evacuating means attached to said fitting; and a covering, impervious to air, covering the external surfaces of said block except said two planar surfaces whereby evacuation of said fitting by said evacuating means holds said thin work piece against said block and holds said block against said machine bed surface.

3. A vacuum fixture for holding a thin work piece on a surface having a predetermined relationship with the surface of a machine bed comprising a block of porous graphite having a first surface complementary to said surface of said machine bed and having a second surface whose positional relationship to said first surface is identical to said desired predetermined relationship between said machine bed and said work piece; a cavity in said block; a fitting attached to said block and communicating with said cavity; evacuating means attached to said fitting; and a covering, impervious to air, covering the external surfaces of said block except said first and second surfaces whereby evacuation of said fitting by said evacuating means holds said block against said machine bed and said thin work piece against said block.

References Cited in the file of this patent

UNITED STATES PATENTS

| | | |
|---|---|---|
| 1,592,536 | O'Neill | July 13, 1926 |
| 2,048,718 | Wemhoener | July 28, 1936 |
| 2,446,295 | Morrison | Aug. 3, 1948 |